UNITED STATES PATENT OFFICE.

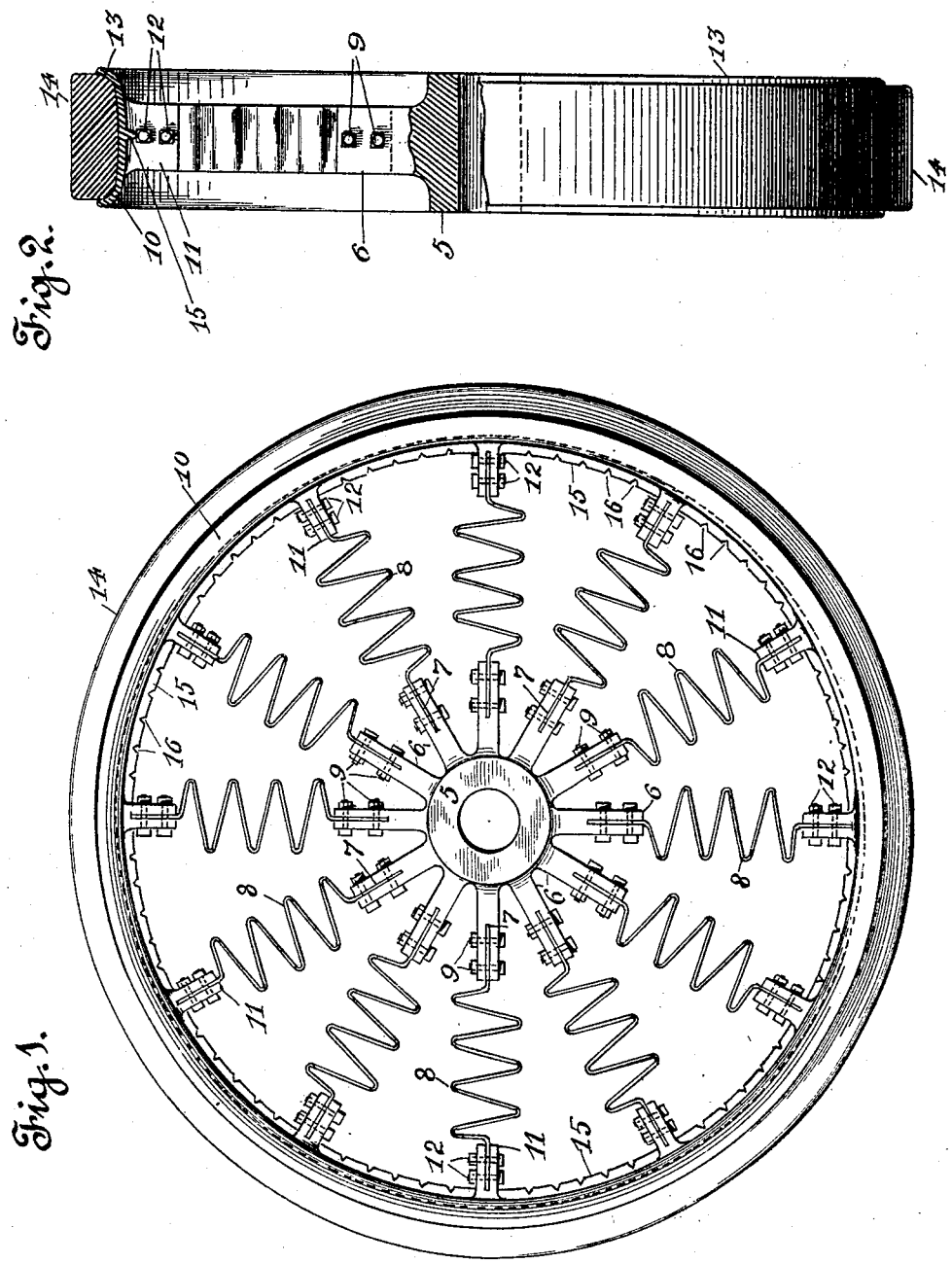

JEREMY C. WILLMON, OF LOS ANGELES, CALIFORNIA.

VEHICLE-WHEEL.

No. 930,111.  Specification of Letters Patent.  Patented Aug. 3, 1909.

Application filed March 11, 1908. Serial No. 420,361.

*To all whom it may concern:*

Be it known that I, JEREMY C. WILLMON, a citizen of the United States, residing in Los Angeles, county of Los Angeles, State of California, have invented new and useful Improvements in Vehicle-Wheels, of which the following is a specification.

My invention relates to a spring wheel for vehicles to enable the same to travel smoothly over the ground without producing unnecessary jarring motion on the superstructure thereby, and the object thereof consists in constructing a wheel of spring metal spokes attached to the hub and rim in a novel manner, and also in other novel parts of the wheel hereafter described.

In the accompanying drawings: Figure 1 is a side elevation of the complete wheel. Fig. 2 is an edge elevation partly in section of the wheel.

In the drawings 5 is the hub which is preferably made of cast steel with spoke arms 6 cast integral therewith. These spoke arms are slitted radially and longitudinally the hub for the insertion in slits 7 of the inner end of the accordion springs 8 which are secured therein by bolts 9 which pass through the arm and through the end of the spring.

10 is a felly also preferably made of cast steel to which is secured, preferably by being cast integral therewith, spring securing lugs 11 which are slitted longitudinally for the reception of the outer ends of the accordion springs which are secured therein by bolts 12 which pass through said lugs and through the outer ends of the springs. In the outer surface of the felly is a channel 13 into which is received tire 14 which is preferably made of rubber. On the other side, the felly is provided with a stiffening rib 15 having notches 16. These notches provide means for holding a rope from slipping when the tire is wrapped with a rope. By the use of accordion shaped springs the same can be made wide enough and heavy enough to withstand the side thrust upon a vehicle wheel and at the same time retain sufficient resiliency to obviate any violent shock to a person traveling in the vehicle. By slitting the hub arms and felly lugs, a ready and efficient means is provided for the reception of the ends of the springs, which can be secured thereto by the use of a minimum amount of material, and labor. In case of injury to a spring, a new spring can be quickly inserted in place of the injured one.

Having described my invention what I claim is:

1. In a vehicle wheel a felly having a tire channel in its outer surface and having spring lugs in its inner surface, said spring lugs being slitted longitudinally, and a stiffening rib provided with notches.

2. A vehicle wheel comprising a cast hub provided with spoke arms, said spoke arms being slitted longitudinally; a cast felly having a tire channel in its outer surface and lugs slitted longitudinally in its inner surface; accordion springs secured in said spoke arms and in said lugs; and a tire in said channel.

In witness that I claim the foregoing I have hereunto subscribed my name this 4th day of March, 1908.

JEREMY C. WILLMON.

Witnesses:
G. E. HARPHAM,
S. B. AUSTIN.